F. B. PETRIE.
WOOL AND THE LIKE WASHING MACHINE.
APPLICATION FILED NOV. 26, 1915.
1,184,869.
Patented May 30, 1916.
Fig. 1.
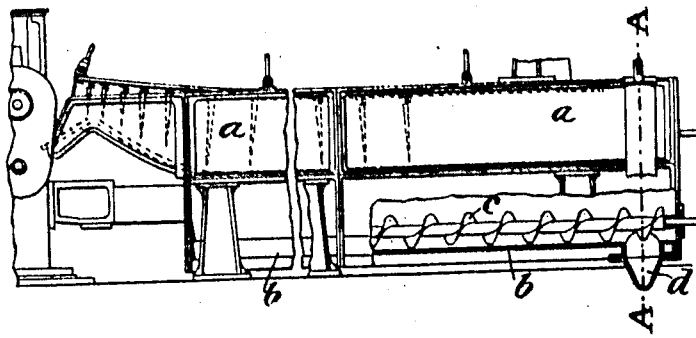
Fig. 2.
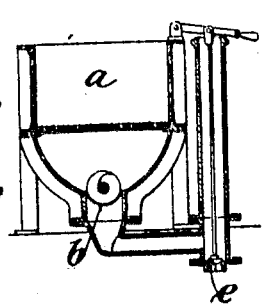
Fig. 3.
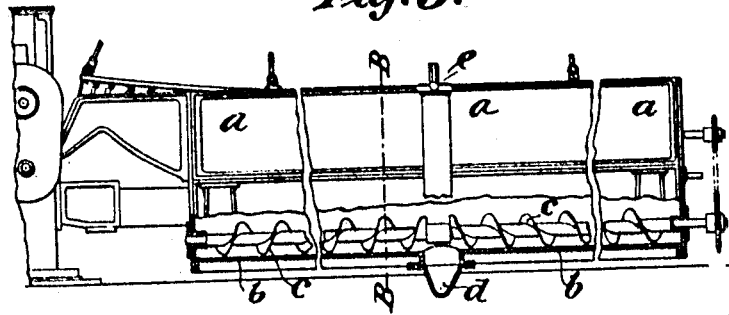
Fig. 4.
Fig. 5.
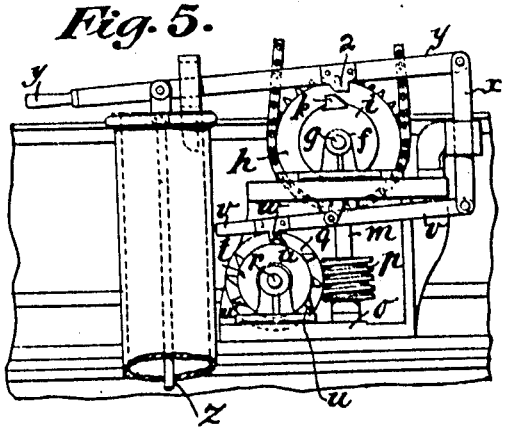
Fig. 6.
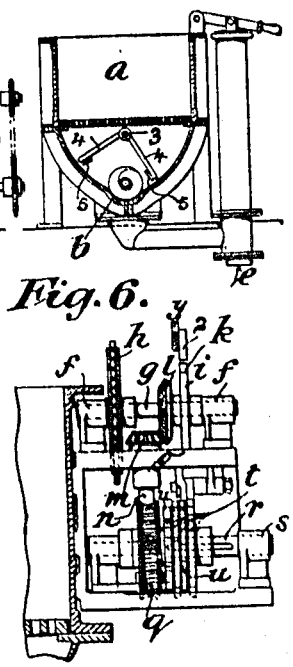
*Inventor.*
Frederick Burford Petrie.
Per Ferdinand Borchardt
*Attorney.*

UNITED STATES PATENT OFFICE.

FREDERICK BURFORD PETRIE, OF ROCHDALE, ENGLAND.

WOOL AND THE LIKE WASHING MACHINE.

1,184,869.   Specification of Letters Patent.   Patented May 30, 1916.

Application filed November 26, 1915.   Serial No. 63,619.

*To all whom it may concern:*

Be it known that I, FREDERICK BURFORD PETRIE, a subject of the King of Great Britain, residing at Rochdale, in the county of Lancaster, England, have invented certain new and useful Improvements in Wool and the like Washing Machines; and I do hereby declare the following to be a full, clear, and exact description of the invention, such as will enable others skilled in the art to which it appertains to make and use the same.

My invention relates to improvements in the conveying means employed in the lower part of the bowl or bowls of wool and the like washing machines for the purpose of mechanically continuously removing the foreign matter accumulating in a trough at the bottom of the bowl to a valve controlled outlet and discharging the said matter from the said outlet.

My invention has for its object to render the said means more efficient, to cause the liquor in the bowl to be practically maintained always in an even condition throughout the operation and consequently the wool or the like to be washed uniformly.

My invention has also for its object to prevent the foreign matter from accumulating on the sides of the bowl and cause it to descend to the bottom of the bowl for removal by the said means. To this end I employ at the bottom of each bowl one or more mechanically operated conveyers in combination with a valve controlled outlet arranged either at one or both ends or in the middle of the said trough into which the said foreign matter is delivered by the said screw-conveyers. The said outlet or outlets I provide with a valve operated periodically by suitable automatic means. To prevent as hitherto the accumulation of foreign matter at the sides of the bowl I employ in the lower part thereof an agitator suitably actuated, and constructed as hereinafter described.

I attain these objects by the mechanism illustrated in the accompanying drawing, in which—

Figures 1 and 3 are side elevations partly in section and Figs. 2 and 4 cross sections thereof at lines A—A and B—B respectively. Figs. 5 and 6 are respectively a detached side view and an end view on an enlarged scale of the means for operating the outlet valves periodically automatically.

Similar letters refer to similar parts throughout the several views.

Referring to Figs. 1 and 2, according to one embodiment of my invention, I form the bottom of the bowl $a$ in the middle with a trough $b$ extending from end to end of the bowl in which trough I employ a screw-conveyer $c$, in combination with an outlet arranged at one end thereof, preferably hopper shaped and controlled by a valve $e$ into which outlet the foreign matter is delivered by the screw-conveyer $c$. When opening the valve $e$ any foreign matter lying in the outlet $d$ is flushed out with some of the liquor contained in the bowl.

Referring to Figs. 3 and 4 according to another embodiment of my invention, in some cases I may employ in the trough $b$, two or more of the screw-conveyers $c$, having a left and a right hand screw thread, in connection with an outlet $d$ and outlet valve $e$ arranged in the middle thereof, as shown in the present instance. The said screw-conveyer (or conveyers) may be driven in any suitable manner, say from the squeezing rollers or the driving shaft of the machine and the said valve operated periodically by hand, as shown in Figs. 2 and 4, or preferably by suitable automatic means in such a manner that the same will be caused to remain always open for the same length of time and consequently discharge approximately always the same quantity of liquor. To this end and referring to Figs. 5 and 6, I mount adjacent to the outlet valve $e$ in bearings $f$, a driving shaft $g$ which has secured thereon a chain wheel $h$ driven from any suitable rotating part of the machine. On the shaft $g$ is also secured a disk $i$ having a lifting projection $k$ and a bevel wheel $l$ in gear with another bevel wheel $m$ secured to the upper end of a vertical shaft $n$ mounted in bearings $o$. The lower end of this vertical shaft has secured thereto a worm $p$ in gear with a worm wheel $q$ secured on a horizontal driven shaft $r$ mounted in bearings $s$ and having also slidably keyed thereto a series of disks $t$ each of which has lifting projections $u$ which vary in number. Above the disks $t$ is suitably fulcrumed a lever $v$, near its free end furnished with a projection $w$ adapted to be operated upon by one of the lifting projections $u$ on the disks $t$ in register therewith. To the other end of the lever $v$ is pivoted a link $x$ having pivotally connected thereto a lever arm *y* extending over the disk *i* and the other end of which is pivoted to the rod *z* of the said outlet valve. This lever arm is provided with a projection 2 adapted to be operated upon by the lifting projection *k* of the disk *i*. The ratio of the said bevel and worm and worm wheel gearing is such that the shaft *r* will revolve much slower than the driving shaft *y*, say make one revolution to 30 revolutions of the driving shaft *g*. While the said outlet valve is closed, the parts operating the same, are in the position shown in Figs. 5 and 6. When one of the disk projections *u* meets the lever projection *w*, the lever *v* is caused to turn on its fulcrum and the link *x* pulling down the rear end of the lever *y*, its projection 2 is brought into the path of the disk projection *k* and the latter then raising the lever *y* and the rod *z* connected therewith, the said outlet valve is opened.

The disk projections *u* are so proportioned that they hold the lever *v* in its raised position sufficiently long to operate the lever *y* and thus cause the said outlet valve to be opened. As soon as the disk projection *k* has passed the lever projection 2, the lever *y* drops into its normal position and the rear end of the lever *y* is raised by the link *x* which lifts the lever projection *w* out of the path of the disk projection *u* and thereby allows the outlet valve rod *z* to drop and thus close the said valve.

Referring again to Fig. 4, if deemed necessary, I may also employ an agitator in the bottom compartment of the bowl *a* to prevent the foreign matter accumulating on the sides thereof and to cause it to descend to the conveyer (or conveyers). The said agitator consists of an oscillating shaft 3 furnished with arms 4 carrying paddles 5.

I claim:

1. In a wool and the like washing machine of the type hereinbefore referred to and comprising one or more liquor bowls, an outlet at the bottom of the said bowls, a mechanically actuated conveyer mounted at the said bottom for delivering the foreign matter accumulating at the said bottom to the said outlet, a valve in connection with the said outlet for periodically discharging the said foreign matter and means for automatically operating the said valve, for the purpose specified.

2. In a wool and the like washing machine of the type hereinbefore referred to and comprising one or more liquor bowls, a trough at the bottom of the said bowls, an outlet in connection with the said trough, a mechanically actuated rotary-conveyer mounted in the said trough for delivering the foreign matter accumulating in the said trough to the said outlet, the said conveyer having a screw thread and a valve in connection with the latter permitting the periodical discharge of the said foreign matter, for the purpose specified.

3. In a wool and the like washing machine of the type hereinbefore referred to and comprising one or more liquor bowls, a trough at the bottom of the said bowls, an outlet in connection with the said trough, a mechanically actuated conveyer having a screw thread mounted in the said trough for delivering the foreign matter accumulating in the said trough to the said outlet, a valve in connection with the latter permitting the periodical discharge of the foreign matter, and means for automatically operating the said valve, for the purpose specified.

4. In a wool and the like washing machine of the type hereinbefore referred to and comprising one or more liquor bowls, a trough at the bottom of the said bowls, an outlet in connection with the said trough, a mechanically actuated screw-conveyer mounted in the said trough for delivering the foreign matter accumulating in the said trough to the said outlet and a valve in connection with the latter permitting the periodical discharge of the foreign matter, the said screw-conveyer having a left and a right hand thread and the said outlet being located in the middle of the said trough, for the purpose specified.

5. In a wool and the like washing machine of the type hereinbefore referred to and comprising one or more liquor bowls, an outlet at the bottom of the said bowls, a mechanically actuated conveyer mounted at the said bottom for delivering the foreign matter accumulating on the said bottom to the said outlet, a valve in connection with the said outlet permitting the periodical discharge of the foreign matter and means for automatically operating the said valve, the said means comprising a quickly rotating disk having a lifting projection, a slowly rotating disk having a plurality of lifting projections, a lever in operative connection with the said slowly rotating disk and a lever arm in operative connection with the said quickly rotating disk one end of the latter lever being pivotally connected with the said valve and the other linked to the lever in operative connection with the said slowly rotating disk, for the purpose specified.

6. In a wool and the like washing machine of the type hereinbefore referred to and comprising one or more liquor bowls, an outlet at the bottom of the said bowls, a mechanically actuated conveyer mounted at the said bottom for delivering the foreign matter accumulating at the bottom of the bowl to the said outlet, a valve in connection with the latter permitting the periodical discharge of the foreign matter, and means located in the bottom compartment of the said bowl for agitating the liquor to prevent the foreign matter accumulating on the sides of the bowl and thereby insure the same accumulating at the bottom of the bowl, for the purpose specified.

7. In a wool and the like washing machine of the type hereinbefore referred to and comprising one or more liquor bowls, an outlet at the bottom of the said bowls, a mechanically actuated conveyer mounted at the said bottom for delivering the foreign matter accumulating at the said bottom to the said outlet, a valve in connection with the latter permitting the periodical discharge of the foreign matter, and means located in the bottom compartment of the said bowl for agitating the liquor to prevent the foreign matter accumulating on the sides of the bowl and thereby insure the same accumulating at the said bottom, the said means comprising an oscillating shaft furnished with arms carrying paddles, for the purpose specified.

Signed at Manchester, England, this 16th day of November, 1915.

FREDERICK BURFORD PETRIE.

Witnesses:
FERDINAND B. BOSSHARDT,
STANLEY E. BRAMALL.

Copies of this patent may be obtained for five cents each, by addressing the "Commissioner of Patents, Washington, D. C."